United States Patent [19]
Harrington et al.

[11] Patent Number: 5,720,205
[45] Date of Patent: Feb. 24, 1998

[54] VISCOUS TORSIONAL VIBRATION DAMPER WITH MULTI-COMPONENT HOUSING WELDMENT

[76] Inventors: David Harrington; Janusz Walkowc, both of Stahl International, Inc., 1887 Vander Horn Dr., Memphis, Tenn. 38184

[21] Appl. No.: 572,801

[22] Filed: Dec. 15, 1995

[51] Int. Cl.⁶ ................................. F16F 15/22
[52] U.S. Cl. .................. 74/573 F; 74/572; 74/573 R
[58] Field of Search ........................... 74/572–574

[56] References Cited

U.S. PATENT DOCUMENTS

| | | |
|---|---|---|
| 2,514,139 | 7/1950 | O'Connor . |
| 3,512,612 | 5/1970 | Bragg et al. . |
| 4,226,139 | 10/1980 | Zilahi-Szabo . |
| 4,386,728 | 6/1983 | Torok et al. . |
| 4,745,257 | 5/1988 | Rito et al. . |
| 4,872,369 | 10/1989 | Critton et al. . |
| 4,916,284 | 4/1990 | Petrick . |
| 4,953,778 | 9/1990 | Critton et al. . |
| 5,058,453 | 10/1991 | Graham et al. . |
| 5,236,115 | 8/1993 | Pape . |
| 5,592,858 | 1/1997 | Taylor ........................ 74/573 R |

FOREIGN PATENT DOCUMENTS

| | | | |
|---|---|---|---|
| 1144784 | 4/1983 | Canada ...................... 74/572 |
| 0145182 | 6/1985 | European Pat. Off. .................. 74/572 |
| 1288051 | 2/1962 | France ........................ 74/572 |
| 90254 | 5/1972 | German Dem. Rep. ............. 74/573 F |
| 1270448 | 11/1986 | U.S.S.R. ...................... 74/573 F |
| 7262 | 3/1890 | United Kingdom ................... 74/572 |
| 216548 | 5/1924 | United Kingdom ................... 74/572 |
| 824642 | 12/1959 | United Kingdom ................... 74/572 |
| 1504998 | 3/1978 | United Kingdom ................. 74/573 F |

*Primary Examiner*—Vinh T. Luong

[57] ABSTRACT

A torsional vibration damper housing includes four or more components that are attached to one another utilizing a high intensity welding procedure. In particular, the housing includes a circular hub portion cut or machined from a flat plate. Attached to the hub portion is an inner hollow cylinder that is preferably cut to length from available tube stock. A pair of circular flat plates are attached to, and extend radially away from, the inner hollow cylinder. Finally, an outer hollow cylinder, which is also preferably cut to length from available tube stock, is attached adjacent the outer edges of the circular flat plates to define a housing having a sealed annular chamber with a rectangular cross section. The multi-component structure allows for the use of a ring mass having a nearly rectangular cross section and the use of relatively thinner walled housing components.

16 Claims, 3 Drawing Sheets

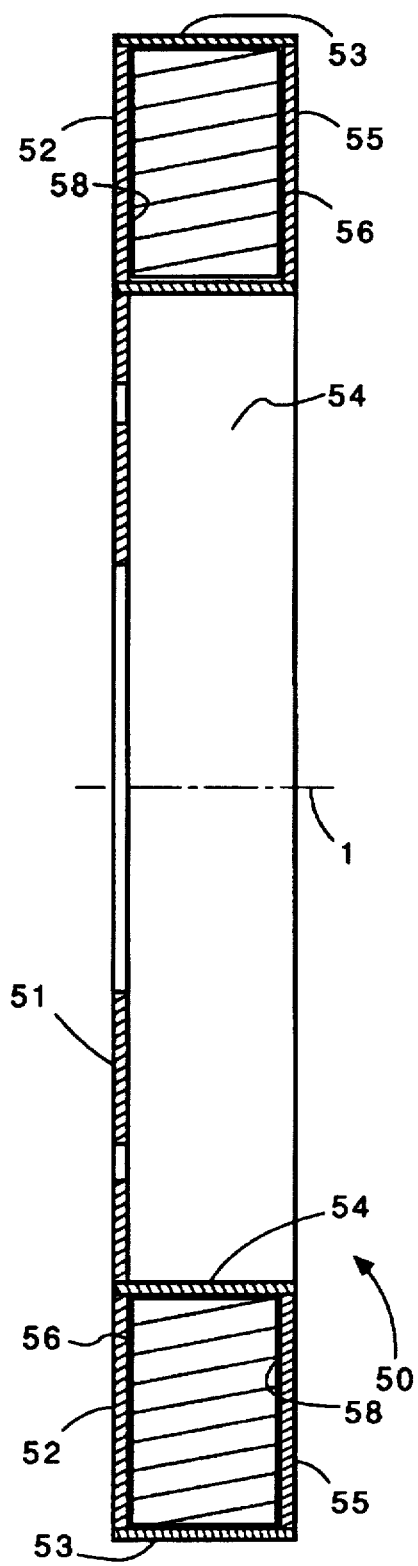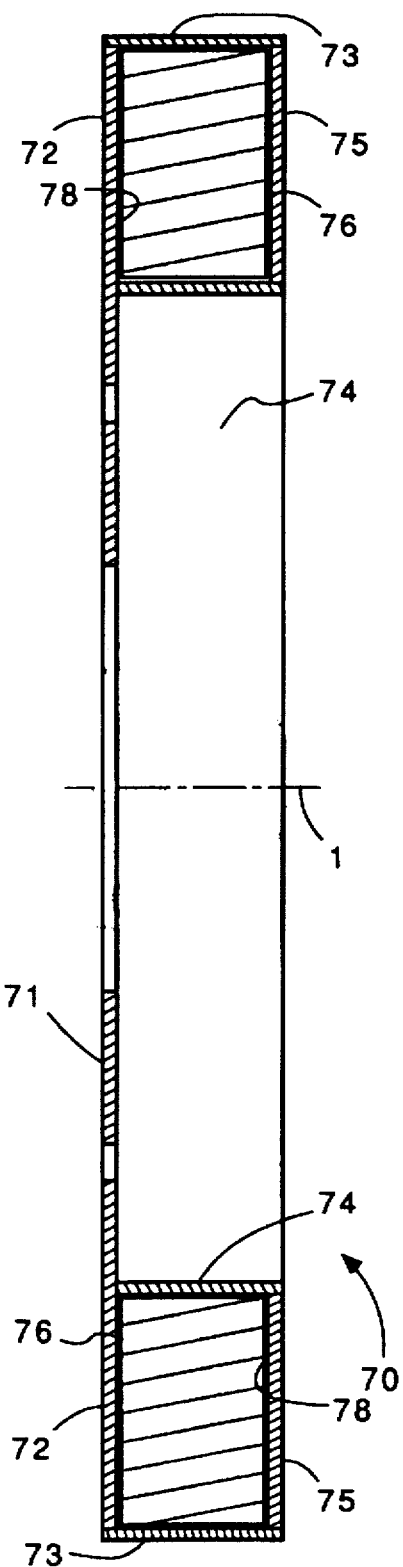
Figure 4
Figure 5

VISCOUS TORSIONAL VIBRATION DAMPER WITH MULTI-COMPONENT HOUSING WELDMENT

FIELD OF THE INVENTION

The present invention relates generally to viscous torsional vibration dampers, and in particular, to improved housing weldments for torsional vibration dampers.

BACKGROUND OF THE INVENTION

Viscous torsional vibration dampers have changed very little in design since those first described in U.S. Pat. No. 2,514,139 to O'Connor, which issued on Feb. 24, 1947. Typically, the torsional vibration damper includes a circular housing having a sealed annular chamber. The housing includes a hub portion that mounts at a damper location along a rotating shaft to be damped. A ring mass having the ability to rotate with respect to the housing is sealed in the annular chamber with an amount of viscous damping fluid that dynamically couples the ring mass to the housing in the presence of a torsional vibration.

Until recently, torsional vibration damper housings of the prior art usually consisted of two pieces: a casing portion and a cover plate. The casing portion includes an annular U-shaped channel that can be made in a number of ways, including stamping a piece of sheet metal, machining an iron casting, or even made by working steel in accordance with U.S. Pat. No. 5,236,115 to Pape. In order to insure sufficient strength in the casing, the U-shaped channel typically includes radii that detract from the U-shaped channel having square corners. As a consequence, the ring masses of prior art vibration dampers must necessarily include relatively large annular bevels so that the corners of the ring mass clear the internal radii of the U-shaped channel.

In many applications, such as for damping various components of a motorized vehicle, other unrelated criteria normally require that the torsional vibration damper be sized to fit within a predetermined envelope. In other words, for a typical motorized vehicle application, the torsional vibration damper must perform satisfactorily and be sized to fit within a predetermined envelope. Although there are exceptions, as a general rule performance of a given torsional vibration damper is maximized when the housing has a virtually negligible moment of inertia relative to the ring mass. Unfortunately, the structure of prior art torsional vibration dampers results in the inclusion of unwanted extra material in the housing and the exclusion of additional mass from the ring mass because of the necessary inclusion of radii and bevels, respectively. Thus, a torsional vibration damper housing that eliminates the internal radii of the prior art to enable the use of a relatively larger ring mass having a measurably larger moment of inertia is needed.

SUMMARY OF THE INVENTION

In responding to this need, the present invention contemplates a torsional vibration damper having a multi-component housing. The housing includes a first circular flat plate and a second circular flat plate welded between an inner hollow cylinder and an outer hollow cylinder to define a sealed inner chamber with a rectangular cross section. A ring mass having a substantially rectangular cross section just smaller than that of the sealed inner chamber is positioned within the chamber. Finally, a viscous damping fluid is positioned in the chamber and remains in contact with the inner surface of the chamber and the outer surface of the ring mass. As in all viscous dampers, the ring mass has the ability to rotate with respect to the housing.

The multi-component housing weldment of the present invention has square interior corners that permit the ring mass to have a measurably larger moment of inertia than that possible in typical damper designs of the prior art. The invention also allows for a relatively larger ring mass in a given available design envelope since the increased strength of welded connections permit the housing to have relatively thinner walls than the damper housings of the prior art.

One object of the present invention is to provide torsional vibration dampers with improved performance in a fixed design envelope.

Another object of the present invention is a torsional vibration damper housing having relatively square interior corners.

Still another object of the present invention is an improved torsional vibration damper and method of making the same.

BRIEF DESCRIPTION OF THE DRAWINGS

FIG. 4 is a sectioned side elevational view of a torsional vibration damper according to another embodiment of the present invention.

FIG. 5 is a sectioned side elevational view according to still another embodiment of the present invention.

DETAILED DESCRIPTION OF THE PREFERRED EMBODIMENTS

Figure 1:
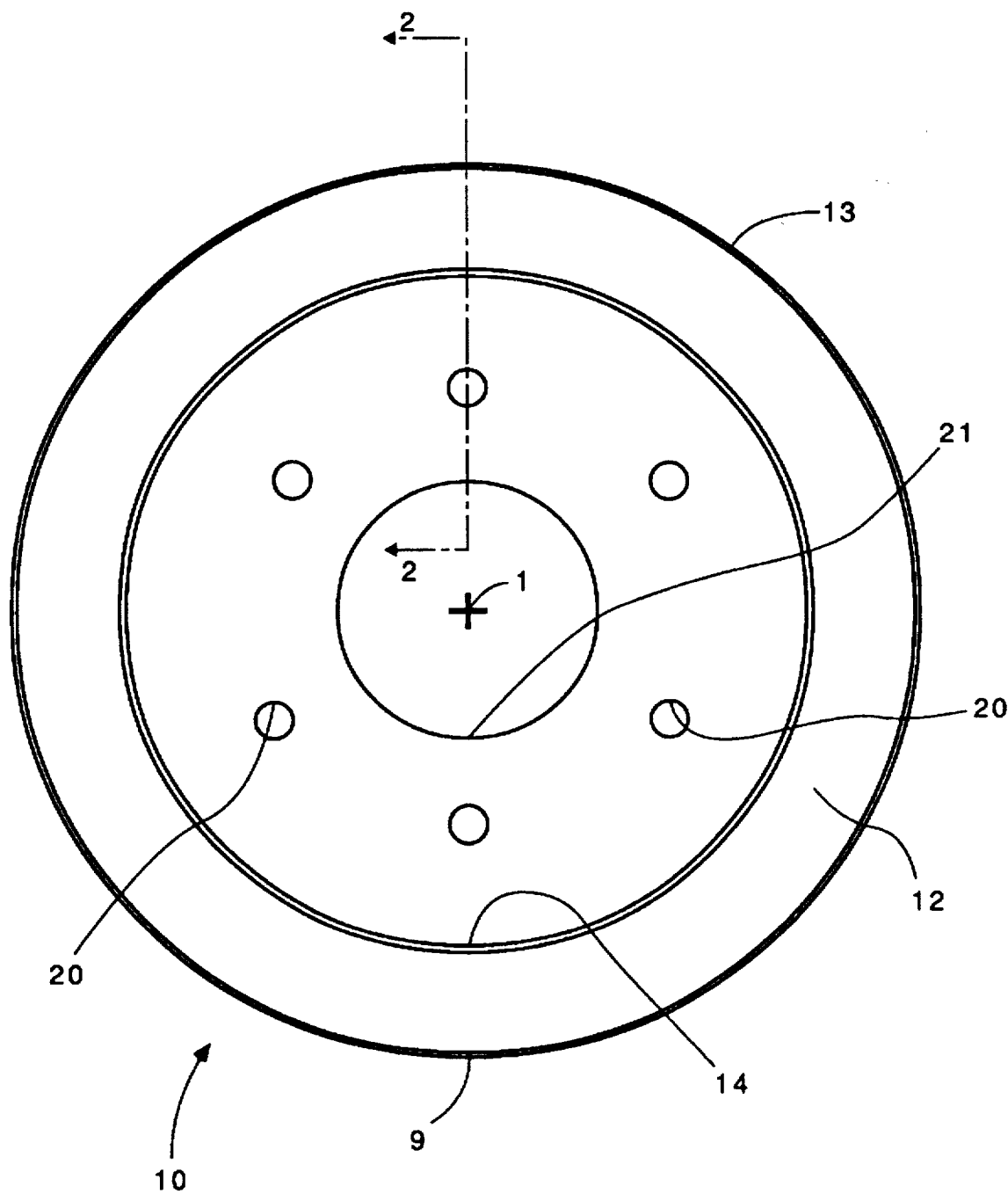
FIG. 1 is a front elevation view of a torsional vibration damper according to the present invention.

Referring now to FIG. 1, a torsional vibration damper 10 according to the preferred embodiment of the present invention includes a multi-component housing 9. The housing 9 has a circular hub portion 11 with a central axis 1 and a central opening 21 sized to receive the particular rotating shaft to be damped. Hub portion 11 is typically attached to a flange on the particular rotating shaft via bolt openings 20. Hub portion 11 is attached via a perimeter weld to the medial surface of a first hollow cylinder 14. A first circular flat plate 12 is welded at its inner and outer perimeters between hollow cylinder 14 and a second hollow cylinder 13. In this embodiment, circular flat plate 12 has an outer diameter about equal to the inner diameter of hollow cylinder 13 and a concentric inner opening with a diameter about equal to the outer diameter of hollow cylinder 14. These components are preferably secured together using a high intensity perimeter weld, such as a high intensity laser welding procedure known in the art, but could also conceivably be attached to one another using an appropriate adhesive or mechanical fasteners, or possibly even a press fit connection.

Figure 2:
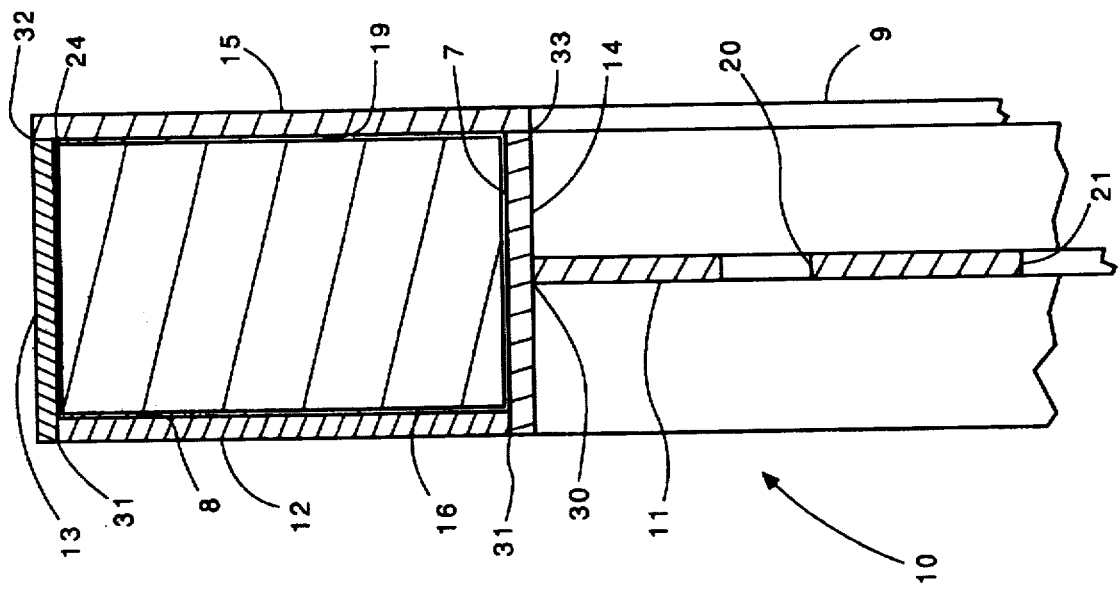
FIG. 2 is a sectioned partial side elevational view of the damper of FIG. 1 along section lines 2—2.

Referring now to FIG. 2, the inner structure of damper 10 is illustrated. As stated above, hub 11 is attached via a perimeter weld at area 30 to the medial surface of hollow cylinder 14. Hub 11 is manufactured or machined to a relatively perfect circle. Also as discussed above, circular flat plate 12 is welded at its peripheral edges 31 to the outer and inner surfaces of hollow cylinders 14 and 13, respectively. Like hub 11, circular flat plate 12 is precisely cut or machined in a circle to very closely match the inner diameter of hollow cylinder 13. The attachment procedure is preferably carried out utilizing a high intensity laser welder so that the heat effected zone from the welding process is kept relatively localized. Also, it is preferable that no material be added to complete the weld in order to ensure square corners where the two pieces are joined. It should be appreciated by those skilled in the art that since the plates can be machined to relatively perfect circles, any circularity imperfections in the hollow cylinders can be removed by joining the various components. Although this embodiment shows the various components joined with butt welds, the present invention also contemplates other joints, including but not limited to mitered or stepped joints.

When attached, inner and outer hollow cylinders 13 and 14, and circular flat plate 12 form a casing having an annular U-shaped channel 7 with square interior corners. A ring mass 16 and an amount of viscous damping fluid 19 are positioned within the U-shaped channel 7. Damping fluid 19 is preferably added before circular cover plate 15, which can also be thought of as a second circular plate, is attached, but could also be injected into the damper after the cover plate is attached. In the latter case, injection holes (not shown) would be included and sealed in a known manner after the damping fluid is injected. Circular cover plate 15 has an outer diameter about equal to the outer diameter of hollow cylinder 13 and is attached along edge 32 via a high intensity welding procedure. Likewise, circular Cover plate 15 is also attached along edge 33 of hollow cylinder 14 in order to define a sealed annular inner chamber 8 with a rectangular cross section as shown that encloses the ring mass. Although not illustrated, those skilled in the art will appreciate that there typically must be some bearing material that prevents direct metal to metal contact between the ring mass and the various components that make up the housing 9. Although many ways of solving the bearing problem are known in the art and suitable for use in conjunction with the present invention, torsional vibration dampers made in accordance with the present invention preferably include a thin layer of radial bearing material between the ring mass and inner hollow cylinder 14, and a pair of thrust bearing layers, each of which is positioned between the ring mass and One of the circular flat plates. Almost any known bearing strategy could be used with the present invention. It should also be appreciated that the wetted surfaces must be far more closely toleranced than the exterior surfaces of the various components in order to extend the useful life of the damper by preventing excessive wear on any bearing material or surfaces.

In some instances it may be desirable to pump damping fluid 19 into the rectangular chamber through openings in plate 15 (not shown) after cover plate 15 has been attached. In other applications, a known amount of damping fluid 19 is placed within the U-shaped channel before the attachment of cover plate 15 so that the complete interior surface of the rectangular chamber and the exposed surface of ring mass 16 are wetted by the damping fluid. In either case, the heat effected zone from the high intensity welding attachment prevents damage to the damping fluid 19, any bearing material present, and also prevents ring mass 16 from accidentally becoming welded to the inner surface of the rectangular chamber. This is important since in order to function properly, ring mass 16 must have the ability to rotate about axis 1 relative to the housing. Because the sealed inner chamber has a rectangular cross section, ring mass 16 can be made to have a substantially rectangular cross section just smaller in size than the chamber. Preferably, each of the four corner edges 24 of ring mass 16 are broken to remove burrs and sharp edges to facilitate handling and remove any protruding edges.

Figure 3:
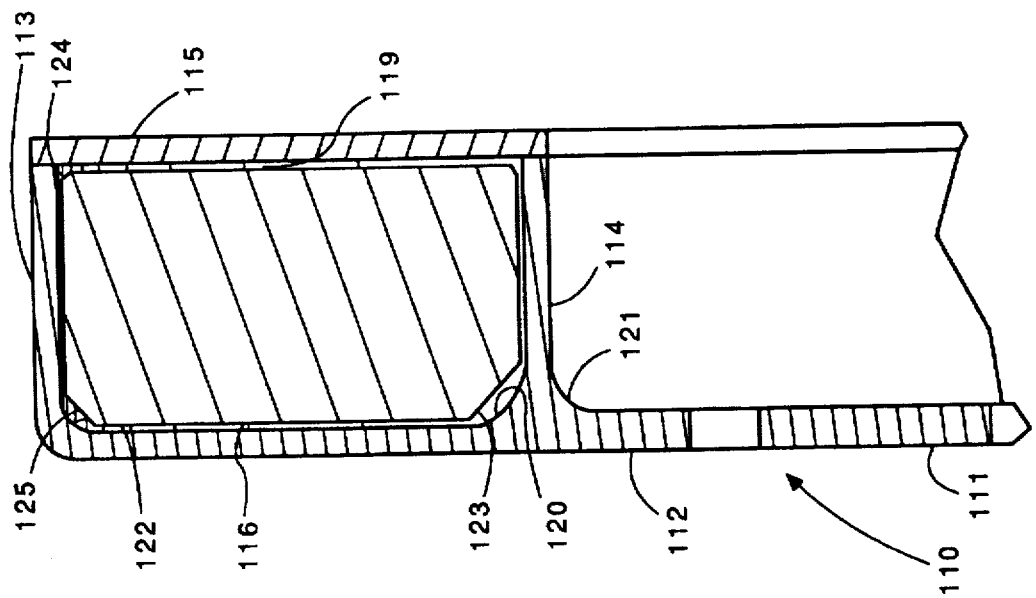
FIG. 3 is a sectioned partial side elevational view of a prior art torsional vibration damper.

A comparison of damper 10 of FIG. 2 with a comparably sized prior art damper 110 of FIG. 3 will be useful in illustrating the advantageous features of the present invention. These dampers are comparable for illustrative purposes for use in a particular application having a limited available envelope of space (outside diameter, width, etc.). As discussed in the introduction, prior art damper 110 includes a casing 111 that is machined or formed to include a side portion 112, an outer cylindrical wall portion 113 and an inner cylindrical wall portion 114. Regardless of whether casing 111 is formed from sheet metal or machined from a casting, it typically includes radii, such as radii 120–122, in order to insure adequate structural strength and to accord with common manufacturing processing. As a consequence, prior art ring mass 116 typically includes relatively large bevels 123 and 125 in order to prevent scoring contact between the ring mass and the inner surface of casing 111. Since the moment of inertia of ring mass 116 is a function of radius raised to the fourth power, the amount of material removed for bevels 123 and 125 measurably subtracts from the ring mass' potential moment of inertia.

Ring mass 16 of the present invention, on the other hand, is substantially rectangular in cross section. As a consequence, ring mass 16 has a measurably larger moment of inertia than the comparable ring mass 116 of the prior art damper 110. On the side where cover plate 115 is attached to casing 11, ring mass 116 includes relatively small radii or champhers 124 which are large enough to insure clearance from the square inner corners of that side of the damper. As in the present invention, damper 110 also typically includes some protective bearing surface(s) and the interior chamber is filled with a viscous damping fluid 19 of a type known in the art. It is important to note that the multi-component damper housing weldment of the present invention permits the use of relatively thinner components since the high intensity welding insures adequate strength at the joints. In general, for a given available envelope it is desirable that the moment of inertia of the ring mass be maximized and the housing be as light as possible. Although not readily perceptible from the drawings of FIGS. 2 and 3, casing 111 must normally have walls that are thicker than those necessary in the multi-component damper of the present invention. As a consequence, prior art housings must inherently have significantly larger moments of inertia than their counterpart housings made in accordance with the present invention.

In one example relating to a particular design envelope, a damper according to the present invention might have an outer diameter on the order of about 13 inches, and include an inner hollow cylinder with a diameter on the order of about 9 inches. In such a case, the circular flat plates and the hollow cylinders would preferably have a thickness on the order of about 0.135 inches. A comparable housing according to the prior art would likely have wall thicknesses measurably larger. Furthermore, the elimination of the relatively large bevels of the prior art ring masses allows the present invention to achieve significant increases in the moment of inertia of the ring mass for a given design envelope.

In terms of performance, the combination of the thinner housing components and the more rectangular shape of the ring mass results in dampers that perform measurably better in a particular application than dampers of the prior art. In other words, the present invention permits the housing's moment of inertia to decrease as the ring mass' moment of inertia is allowed to increase within a given envelope of space. This allows dampers according to the present invention to perform measurably better than torsional vibration dampers of the prior art. Furthermore, it is believed that the multi-component housing weldments of the present invention will simplify the damper manufacturing process and also reduce manufacturing costs relative to typical dampers of the prior art.

Referring now to FIG. 4, a damper 50 according to a second embodiment of the present invention is illustrated. This embodiment is different from damper 10 shown in FIGS. 1 and 2 in that in this case hub 51 is attached adjacent to one edge of hollow cylinder 54, and cover plate 55 is attached along its edges to inner hollow cylinder 54 and outer hollow cylinder 53. Damper 10, on the other hand, has its hub 11 attached in the center of hollow cylinder 14, and cover plate 55 is attached on one side surface as opposed to on its edges to the hollow cylinders. Since circular flat plates 52 and 55 are easily cut or machined to relatively exact circles, they can serve to correct any minor circularity flaws in both hollow cylinder 54 and hollow cylinder 53. Also as in the earlier embodiment, this structure results in a sealed inner chamber having a rectangular cross section 58. As in the earlier embodiment, some bearing material(s) (not shown) is provided in order to inhibit direct metal to metal contact between ring mass 56 and the various components of the damper housing. Thus in the case of damper 50, circular flat plates 55 and 52 are virtually identical, which serves to better streamline the manufacturing process.

FIG. 5 shows a damper 70 according to still another embodiment in which circular flat plate 72 and hub portion 71 are machined or cut from a single flat plate. While the housings for the previous dampers included five individual components: a hub, an inner cylinder, an outer cylinder, a first circular flat plate and a second circular flat plate, the housing of damper 70 includes only four component parts: an inner cylinder 74, outer cylinder 73, a first circular plate 72 and a second circular plate 75. Like the previous embodiments these components are preferably joined via a high intensity welding procedure to yield a housing chamber having a rectangular cross section 78. This allows for a damper that performs better, costs less and is more easily manufactured than dampers of the prior art. In addition, the housing components can be made relatively thinner and the ring mass 72 can have a rectangular cross section rather than the relatively large bevels required of ring masses according to the prior art.

Torsional vibration damper housing weldments according to the present invention are manufactured using the following process. First, tube stock with diameters corresponding to the inner/outer cylinders are cut to length. It is important to note that any tubing, whether it be made by being drawn over a mandrel, rolled sheet metal or even flow formed are suitable to the present invention provided that the eventual wetted surface of the tubing is sufficiently regular and smooth to be utilized in the present invention. The circular flat plates are cut or machined to relatively exact circles. One of the circular flat plates is then fitted between the inner and outer cylinders and is attached thereto via high intensity perimeter welds. An appropriately sized ring mass is manufactured to fit within the U-shaped channel thus far made. Also, a bearing material and possibly an amount of damping fluid is placed within the U-shaped channel with the ring mass. The ring mass can be made in any suitable manner known in the art, such as by casting, cutting, and/or machining. Finally, the cover circular flat plate is positioned appropriately and attached to the remaining components using a pair of high intensity perimeter welds. Finally, the damper is completed by injecting damping fluid into the sealed annular chamber in the event that the damping fluid was not placed within the chamber before attachment of the circular cover plate.

It should be clear that various modifications can be made to the present invention as herein above described and many apparently different embodiments of the same can be made or practiced within the spirit of the invention without departing from the scope of the attached claims. For example, other high intensity welding procedures, other than the laser welding suggested in the written description, could be utilized to practice the present invention. Furthermore, in some applications an appropriate adhesive or mechanical fasteners could be utilized in accordance with the present invention. In any event, it is intended that the above description serve only to aid in an understanding of the invention and is not intended to limit the legal scope of the patent which is defined solely by the claims set forth below.

We claim:

1. A torsional vibration damper comprising:
   a housing having a hub portion and a sealed annular chamber bounded by an interior wetted surface;
   a ring mass having an exterior wetted surface positioned within said sealed annular chamber, and having the ability to rotate with respect to said housing;
   a viscous fluid positioned in said sealed annular chamber and being in contact with said interior wetted surface and said exterior wetted surface; and
   wherein said housing includes a first circular plate and a second circular plate attached between an inner hollow cylinder and an outer hollow cylinder to define said sealed annular chamber;
   that portion of said interior wetted surface defined by said first circular plate and said second circular plate being planar.

2. The torsional vibration damper of claim 1, wherein said first circular plate and said second circular plate are flat.

3. The torsional vibration damper of claim 1, wherein said sealed inner chamber has a rectangular cross section.

4. The torsional vibration damper of claim 3, wherein said ring mass has a substantially rectangular cross section smaller than said rectangular cross section of said sealed inner chamber.

5. The torsional vibration damper of claim 1, wherein said plates are welded to said hollow cylinders.

6. The torsional vibration damper of claim 5, wherein said hub portion is part of said second circular flat plate.

7. The torsional vibration damper of claim 1, wherein said hub portion is part of said second circular flat plate.

8. A torsional vibration damper comprising:
   a sealed housing having an annular interior wetted surface;
   a ring mass having an exterior wetted surface surrounded by said annular interior wetted surface, and being rotatable with respect to said housing;
   a viscous fluid positioned in contact with said annular interior wetted surface and said exterior wetted surface;
   said sealed housing including a first plate and a second plate attached between an inner hollow cylinder and an outer hollow cylinder to define said annular interior wetted surface; and
   that portion of said first plate and said second plate in contact with said fluid being planar.

9. The torsional vibration damper of claim 8 wherein said annular interior wetted surface has a rectangular cross section that is larger than a rectangular cross section of said ring mass.

10. The torsional vibration damper of claim 8 wherein said first plate and said second plate have exterior planar surfaces separated from interior planar surfaces by a circular peripheral edge.

11. The torsional vibration damper of claim 8 wherein said first plate, said second plate, said inner hollow cylinder and said outer hollow cylinder have uniform thicknesses.

12. The torsional vibration damper of claim 8 wherein said inner hollow cylinder and said outer hollow cylinder have regular cylindrical shapes.

13. A torsional vibration damper comprising:

a sealed housing having an annular interior wetted surface and a circular hub portion;

a ring mass having an exterior wetted surface surrounded by said annular interior wetted surface, and being rotatable with respect to said housing;

a viscous fluid positioned in contact with said annular interior wetted surface and said exterior wetted surface;

said sealed housing including a first plate and a second plate attached between an inner hollow cylinder and an outer hollow cylinder to define said annular interior wetted surface;

that portion of said first plate and said second plate in contact with said fluid being planar; and said annular interior wetted surface and said exterior wetted surface have rectangular cross sections.

14. The torsional vibration damper of claim 13 wherein said first plate and said second plate have exterior planar surfaces separated from interior planar surfaces by a circular peripheral edge.

15. The torsional vibration damper of claim 14 wherein said first plate, said second plate, said inner hollow cylinder and said outer hollow cylinder have uniform thicknesses.

16. The torsional vibration damper of claim 15 wherein said inner hollow cylinder and said outer hollow cylinder have regular cylindrical shapes.

* * * * *